United States Patent [19]

Huc

[11] Patent Number: 4,822,628

[45] Date of Patent: Apr. 18, 1989

[54] PROCESS FOR MANUFACTURING A PRODUCT BASED ON HARD-BOILED EGG

[75] Inventor: Christian Huc, Arras, France

[73] Assignee: Ov'Action SA, Lievin, France

[21] Appl. No.: 148,975

[22] Filed: Jan. 27, 1988

[30] Foreign Application Priority Data

Jan. 30, 1987 [FR] France .................. 87 01234

[51] Int. Cl.$^4$ .................. A23L 1/32
[52] U.S. Cl. .................. 426/274; 426/512; 426/515; 426/614
[58] Field of Search ............ 426/274, 614, 512, 515, 426/518

[56] References Cited

U.S. PATENT DOCUMENTS

| 3,798,336 | 3/1974 | Hawley | 426/512 |
| 3,978,779 | 9/1976 | Petersen et al. | 99/353 |
| 4,092,093 | 5/1978 | Nakagawa | 426/512 |

FOREIGN PATENT DOCUMENTS

| 2172904 | 10/1973 | France . | |
| 2292440 | 6/1976 | France . | |
| 2475361 | 8/1981 | France . | |
| 60-237964 | 11/1985 | Japan | 426/614 |
| 61-015664 | 1/1986 | Japan | 426/614 |
| 249359 | 4/1948 | Switzerland . | |
| 2156649 | 10/1985 | United Kingdom . | |

Primary Examiner—Wilbur Bascomb
Attorney, Agent, or Firm—Shenier & O'Connor

[57] ABSTRACT

This invention relates to a process for manufacturing a product based on egg in the hard-boiled state, constituted by a plurality of superposed, fast-joined layers, one layer of white alternating with a layer of yolk, of rectangular section. The process consists in the following steps: (a) supplying fresh runny egg white in $n_1$ moulds, and fresh runny egg yolk in $n_2$ moulds, the sum $n_1 + n_2$ being at least equal to two and $n_1$ being equal to $n_2$ or different from $n_2$ by one unit; (b) pre-cooking each runny liquid up to coagulation; (c) removing from moulds; (d) superposing the coagulated layers, a layer of yolk being adjacent a layer of white; (e) cooking the superposed layers, under slight pressure, up to hardening. The finished product is preferably in the form of a cube and is used as aperitive snack.

17 Claims, 1 Drawing Sheet

PROCESS FOR MANUFACTURING A PRODUCT BASED ON HARD-BOILED EGG

FIELD OF THE INVENTION

The present invention relates to the manufacture of a product based on egg, of the type in which the white and the yolk are individualized in the hard boiled state. It relates to a process of manufacture and to the product obtained, constituted by a plurality of superposed, fast-joined layers, one layer composed essentially of yolk alternating with a layer composed essentially of white.

BACKGROUND OF THE INVENTION

Products of this type are already known. In particular, French Patent No. 2,172,904 describes a product in which the white and the yolk are in substantially flat, superposed layers, and in which a layer of yolk is included between two layers of white, in the hard boiled state. However, the process for manufacturing this known product consists, after having broken the eggs, in separating the yolks and the whites, taking care not to break the vitelline membrane of the yolks, in cooking the whole yolks in their vitelline membrane, in shaping the cooked yolks, in cooking the white and in shaping it, then bringing the yolk and the white into contact. This process is very difficult to carry out since it necessitates maintaining the yolk in the vitelline membrane which, in the egg, is the membrane protecting the yolk.

French Patent No. 2,292,440 discloses another process for a product based on egg, but having a cylindrical shape, having an inner cylindrical part made with hard-boiled egg yolk and an outer tubular part surrounding the inner part, made with hard-boiled egg white. The process for manufacturing this known product consists in injecting egg white in a cylindrical mould presenting an inner core, in pre-coagulating the white by taking it to a certain temperature, in removing the inner core, in introducing pre-heated egg yolk into the central cavity left free by the removal of the core, in terminating coagulation of the white and yolk and in removing from the mould the cylindrical product obtained. This process is exclusive to a cylishape of the product; it is not suitable for an egg-based product in which the white and the yolk are in superposed flat layers. Moreover, precoagulation of the white and of the yolk is necessarily effected in two successive steps.

SUMMARY OF THE INVENTION

A process for manufacturing a product based on egg in the hard-boiled state has now been found, and this forms the subject matter of the present invention, said product constituted by a plurality of superposed, fast-joined layers, one layer composed essentially of yolk alternating with a layer composed essentially of white, all the layers having a section approximately in the form of a rectangle of the same width, which overcomes the drawbacks observed. According to the invention, the process consists in the following steps:

(a) supplying fresh runny egg white in $n_1$ moulds, and fresh runny egg yolk in $n_2$ moulds, the sum $n_1 + n_2$ being at least equal to two and $n_1$ being equal to $n_2$ or different from $n_2$ by one unit;

(b) pre-cooking each runny liquid up to coagulation;

(c) removing from moulds;

(d) superposing the coagulated layers, a layer of yolk being adjacent a layer of white;

(e) cooking the superposed layers, under slight pressure, up to hardening.

The step of removal from the moulds occurs after coagulation of the separate layers of white and of yolk, as soon as each individual layer is sufficiently hard to be manipulated.

Cohesion of the product is obtained thanks to the two successive steps of pre-cooking and of cooking, the latter being carried out whilst a slight pressure is exerted on the superposed layers. This particular arrangement makes it possible, thanks to the interaction of the constituents of the egg during cooking, to ensure a sufficient catching between each layer of white and of yolk for the product to form a coherent whole and not the juxtaposition of superposed layers.

The moulds are advantageously identical and have a configuration which, by simple demoulding, makes it possible to obtain for each layer the shape of a rectangular parallelepiped. If the moulds have a different configuration, it will be necessary to cut the product after it has hardened completely.

The quantities of liquid egg constituents supplied into the $n_1$ and $n_2$ moulds are advantageously identical, leading to the different layers being of equal dimensions.

Additives are added to the fresh liquid egg constituents and mixed before the moulds are supplied therewith. These additives may be salt, sapidity agents, natural or synthetic colorants.

Pre-cooking and cooking are obtained by any appropriate heating means, for example using a water-bath.

Pre-cooking preferably consists in taking each liquid egg constituent to a temperature of the order of 65° C., and cooking consists in taking the superposed layers to a temperature of the order of 90° C.

In a preferred embodiment of the invention, the number $n_1$ of moulds for fresh liquid egg white is equal to two and the number $n_2$ of moulds for fresh liquid egg yolk is equal to one. The product obtained is thus constituted by three superposed layers, one layer composed essentially of yolk being included between two layers composed essentially of white, thus forming a sort of sandwich.

The product obtained directly by the process is elongated in shape, as a function of the length of the moulds. In order to obtain the finished product at the desired length, the cooking step is advantageously followed by a step of cutting to length.

In the preferred embodiment mentioned hereinabove, the transverse section being a square, the length of cut-out is equal to the side of said square, leading to the product being in the form of a cube.

This preferred embodiment is particularly employed in the use made of the product of the invention as aperitive food. The cube in question will for example have an edge measuring 17 millimeters. When consumed, the cube must be able to be gripped in any manner whatsoever; the layers must thus be joined sufficiently fast to one another for the cube not to deteriorate if the consumer grips, for example, only the top layer of the cube.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
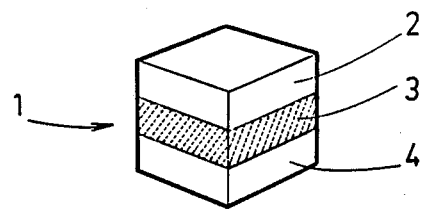
FIG. 1 shows the egg-based product according to the invention.
Figure 2:
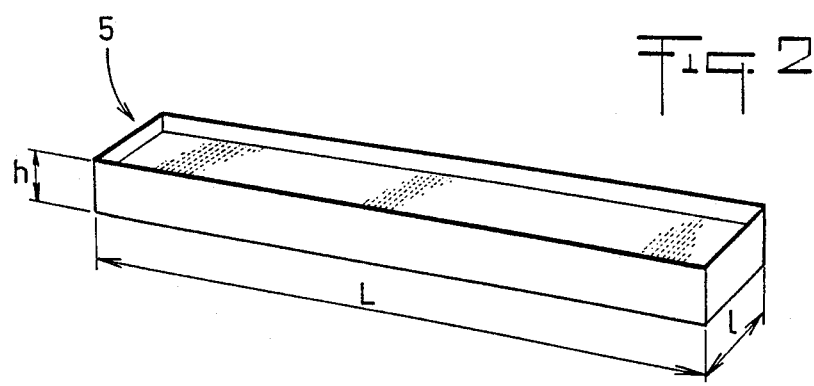
FIG. 2 shows a mould for making said egg-based product.

Referring now to the drawings, the egg-based product 1 is in the form of a cube and comprises three layers 2, 3 and 4, of equal dimensions, each having the configuration of a rectangular parallelepiped. Layers 2 and 4 are constituted by slightly salted, hard-boiled egg white. The intermediate layer 3 is constituted by hard-boiled egg yolk. Layers 2 and 3, and 3 and 4 respectively, are joined fast, with the result that, when the cube 1 is gripped by its top part, layers 3 and 4 do not separate under the effect of gravity. The edge of cube 1 measures 17 millimetres. This cubic product of small dimensions is particularly intended for use as aperitive food, served with biscuits and peanuts. To that end, each cube will be subsequently packed individually.

The cubic product 1 is produced as follows: the whites of fresh eggs were previously separated from the yolks, obtaining liquid egg constituents. A small proportion of salt is added to the liquid white so as to enhance the taste of the final product. A mould 5 having the shape of a rectangular parallelepiped is employed, with an inner width l of 17 millimeters a height h of 10 millimeters and an inner length L of 102 millimetres. Homogenized fresh liquid white is poured into this mould 5 until the height occupied by the liquid in the mould is about 6 millimetres. The same occurs in a second mould with the liquid white, and in a third mould, with liquid yolk. The three moulds are heated in a water-bath until the corresponding fresh liquids coagulate, i.e. when the temperature thereof attains about 65° C. Once this coagulation is effected, the three layers are removed from the moulds and placed in a fourth mould of the same shape as moulds 5, except for the height h which is 17 millimeters: the layer of yolk being between the two layers of white. A plate is placed on the uppermost layer of white, intended to exert a slight pressure on all three layers. The mould is heated in a water bath until the three superposed layers have completely hardened, i.e. when the temperature attains about 90° C., then the product is remove from the mould. Six cubes 1 are obtained from the demoulded product, by cutting said product out transversely every 17 millimeters.

The natural proportion of an egg, between the white and the yolk, being one third of yolk for two thirds of white, this proportion is respected in the product in the example which has just been described. However, the above-described example does not limit the invention. In particular, by the same process of the invention, products may be obtained of which the dimensions, number of layers, height of each layer, may vary as a function of the use envisaged.

What is claimed is:

1. A process for manufacturing a product based on egg, constituted by a plurality of superposed, fast-joined layers, one layer composed essentially of yolk alternating with a layer composed essentially of white, cross-sections of all of said layers being rectangles of the same width (1), said process comprising the following steps of:
   (a) supplying fresh runny egg white in $n_1$ moulds, and fresh runny egg yolk in $n_2$ moulds, the sum $n_1 + n_2$ being at least equal to two and $n_1$ being equal to $n_2$ or different from $n_2$ by one unit;
   (b) pre-cooking each runny liquid up to coagulation to form a layer;
   (c) removing each coagulated layer from its moulds;
   (d) superposing the coagulated layers, a layer of yolk being adjacent a layer of white;
   (e) cooking the superposed layers, under slight pressure, up to hardening.

2. The process of claim 1, wherein pre-cooking consists of taking each liquid constituent of the egg to a temperature of the order of 65° C.

3. The process of claim 1 wherein cooking consists of taking the superposed layers to a temperature of the order of 90° C.

4. The process of claim 2, wherein cooking consists of taking the superposed layers to a temperature of the order of 90° C.

5. The process of claim 1, wherein the quantity of liquid egg constituents supplied in the $n_1$ and $n_2$ moulds is identical.

6. The process of claim 2, wherein the quantity of liquid egg constituents supplied in the $n_1$ and $n_2$ moulds is identical.

7. The process of claim 3, wherein the quantity of liquid egg constituents supplied in the $n_1$ and $n_2$ moulds is identical.

8. The process of claim 4, wherein the quantity of liquid egg constituents supplied in the $n_1$ and $n_2$ moulds is identical.

9. The process of claim 1, wherein $n_1$ is equal to two and $n_2$ is equal to one.

10. The process of claim 2, wherein $n_1$ is equal to two and $n_2$ is equal to one.

11. The process of claim 3, wherein $n_1$ is equal to two and $n_2$ is equal to one.

12. The process of claim 4, wherein $n_1$ is equal to two and $n_2$ is equal to one.

13. The process of claim 5, wherein $n_1$ is equal to two and $n_2$ is equal to one.

14. The process of claim 6, wherein $n_1$ is equal to two and $n_2$ is equal to one.

15. The process of claim 7, wherein $n_1$ is equal to two and $n_2$ is equal to one.

16. The process of claim 8, wherein $n_1$ is equal to two and $n_2$ is equal to one.

17. The process of claim 1, wherein in order to obtain the product at the desired length, cooking is followed by cutting to length.

* * * * *